Patented Nov. 7, 1933

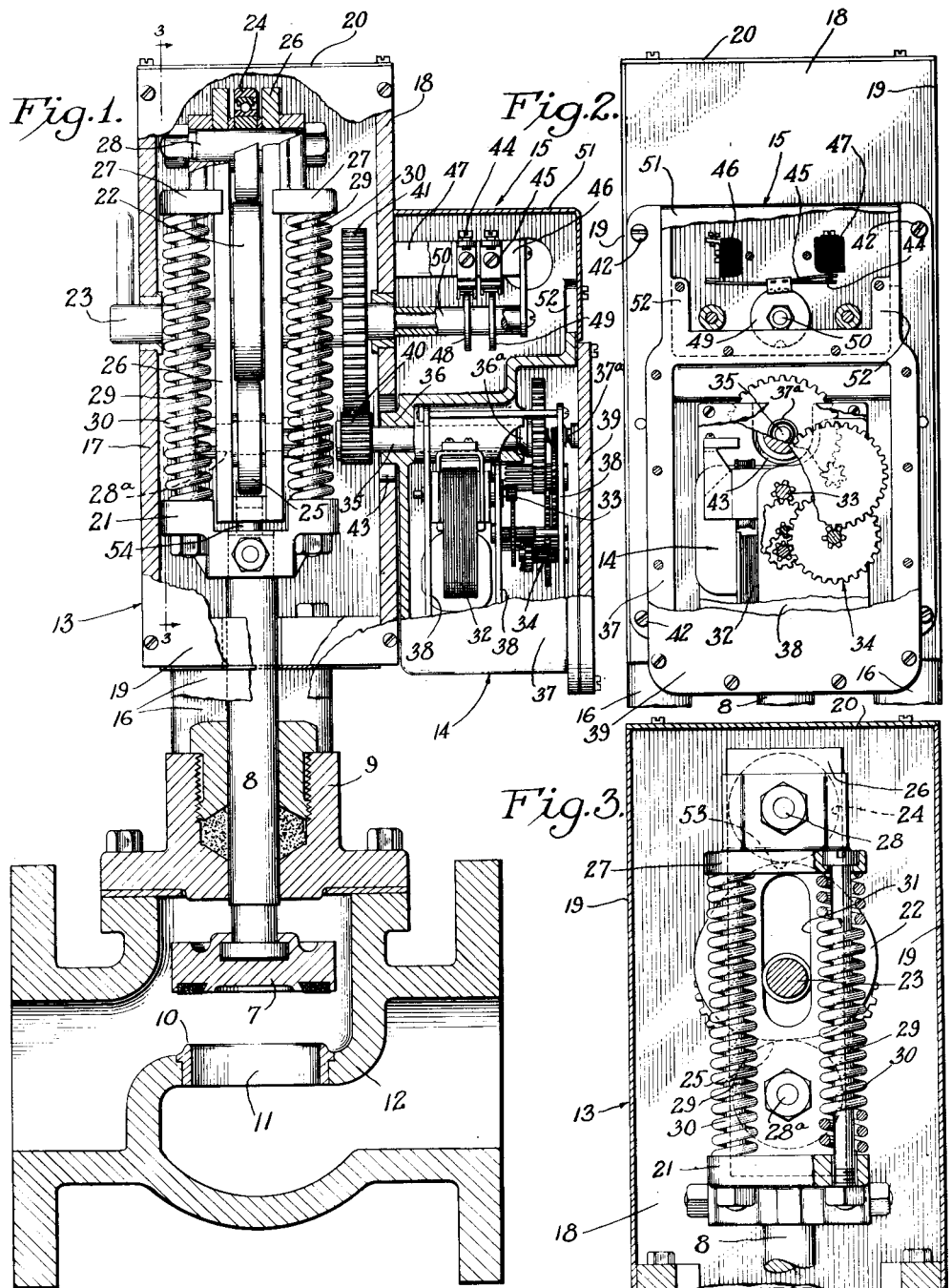

1,933,713

UNITED STATES PATENT OFFICE

1,933,713

POWER DRIVEN VALVE OPERATOR

Preston W. Cummings, Rockford, Ill., assignor to Howard D. Colman, Rockford, Ill.

Application July 1, 1931. Serial No. 548,207

11 Claims. (Cl. 137—139)

The invention pertains to power driven valve operators, and has for its general object the provision of an operator of improved construction especially adapted for use in valves of large sizes in which the valve member is moved axially toward and from its seat by means of an associated power unit including a small electric motor.

Another object is to provide a power driven operator for valves of the character indicated, having an actuating mechanism for the valve member including a rotary actuating element and a plurality of springs advantageously associated therewith for holding the valve member yieldably against its seat against strong opposing pressures.

A further object is to provide a valve operator in which the power unit, including the motor and a multiplying gear train, is enclosed in an oil tight casing advantageously associated with the valve actuating mechanism and its frame structure.

A further object is to provide a power driven valve operator for large valves having the valve operating mechanism, the driving unit and a controlling switch mechanism effectually combined from the standpoint of assembly, compactness and accessibility.

In the accompanying drawing, wherein I have illustrated a preferred embodiment of the invention:

Figure 1 is a fragmentary vertical sectional view showing the improved operator applied to a valve.

Fig. 2 is a fragmentary end view of the operator, certain of the parts being broken away to show features of construction.

Fig. 3 is a fragmentary vertical sectional view taken approximately in the plane of line 3—3 of Fig. 1.

The valve herein shown is of the type in which the valve member moves axially toward and from a seat in its casing. It comprises generally a valve member 7 mounted on the lower end of a stem 8 which is reciprocable in a bonnet 9 toward and from a seat 10. The latter is formed at the upper end of a bushing providing a passage 11 through a casing 12.

The improved operator comprises generally an actuating mechanism for the valve member 7 having a supporting frame 13 mounted on the valve bonnet 9; an electric driving unit 14 mounted on one side of the supporting frame 13 at the lower end thereof; and a controlling switch mechanism 15 disposed above the driving unit and operatively related to the valve actuating mechanism.

The supporting frame 13 for the valve actuating mechanism is in the form of a closed rectangular casing having its lower end mounted upon two upright posts or standards 16 rising from the valve bonnet 9. The casing has two main side plates 17 and 18, end plates 19 and a top plate 20. The valve stem 8 projects upwardly into said casing approximately centrally thereof and has secured at its upper end a head 21, substantially rectangular in form. Reciprocable movement is imparted to the valve through the medium of said head 21 and a yieldable connection, presently to be described, with a cam 22 mounted on a transversely disposed shaft 23 having bearings in the side plates 17 and 18. The cam 22 is of the disk type, and engages at diametrically opposite sides with upper and lower roller followers 24 and 25 respectively, both mounted in a follower frame consisting of two plates 26 secured together in spaced relation and disposed on opposite sides of the cam 22.

At its lower end, the follower frame has a slidable connection with the head 21, and at its upper end is rigid with two abutments 27 which are secured to the plates 26 by means of a bolt 28 providing a support between the plates for the roller follower 24. Each of the abutments 27 is elongated in form, as shown in Fig. 3, and between the end of these two abutments and the four corners of the head 21 extend four bolts 29 with encircling springs 30 entered between the abutments and the head. The upper ends of the bolts 29 (Fig. 3) are slidable in the abutments 27 so as to permit relative movement between the roller follower frame and the valve stem, and to permit of the reciprocation of the follower relative to the shaft 23, its plates 26 are slotted as indicated at 31 (Fig. 3).

The lower follower roller 25 is mounted on a bolt 28ª connecting the two follower plates 26, and both rollers are preferably of the antifriction type as shown clearly in the case of the upper roller (Fig. 1).

The power unit 14 comprises a small electric motor 32 which is preferably a shading ring induction motor. 33 designates a pinion rigid with the armature of the motor, which pinion is operable through a multiplying gear train, generally designated 34, to a driving shaft 35 having an elongated bearing 36 formed in the top wall of an oil tight casing 37. Preferably the upper terminal gear of the gear train 34 has a beveled hub 36ª pressed by a light spring 37ª against the inner end of the bearing 36 to prevent the escape of lubricant through the bearing, the casing being in practice filled with oil. The motor and the multiplying gear train 34 are suitably supported within the casing by means of frames 38, and to permit of access to the casing, a removable cover plate 39 is provided.

The connection between the power unit and the valve actuating mechanism is disengageable in character for convenience in assembling and disassembling the parts. To this end, the outer end of the shaft 35, projecting from the upper portion of the casing, carries a pinion 40 which is engageable with a gear 41 mounted within the frame 13 on the shaft 23 and disposed adjacent the side plate 18 of the frame. The casing 37 is adapted to be removably secured to the side plate 18, as by means of screws 42, so as to maintain the pinion 40 in mesh with the gear 41. To permit of the removal and insertion of the pinion 40 from the frame 13, the plate 18 has an aperture 43 therein, into which the outer end of the bearing 36 projects.

The controlling switch mechanism which governs the operation of the power unit consists in the present embodiment of a pair of switches 44 and 45 supported on two plugs 46 and 47 of insulating material (Fig. 2) and arranged for actuation by two cams 48 and 49 rigid with a sleeve 50 fixed on an extended end of the shaft 23. Any suitable number of switches may of course be provided. To protect the same from dust and dirt, a cover plate 51 is removably secured to brackets 52 formed integral with the casing 37 of the power unit.

In operation, energization of the motor causes rotation of the cam 22, and the latter, operating through the roller followers 24 and 25 and the follower frame, imparts reciprocation to the valve stem 8 through its yieldable connection with the frame. Assuming that the valve is in open position (Figs. 1 and 3) rotation of the cam causes a downward pressure to be exerted upon the upper ends of the springs 30, and such pressure is transmitted through the head 21 to the valve stem 8. The parts are so proportioned that after the valve member engages with its seat 10, the cam may continue to operate to impart an additional downward movement to the follower, in which movement the springs 30 yield as permitted by the sliding of the bolts 29 in the abutments 27. When the cam reaches a position 180° removed from that shown in Fig. 3, the four springs 30 are placed under maximum tension. At this point the circuit to the motor is interrupted by the operation of the controlling switch mechanism. The cam 22 thus comes to rest with a dwell surface 53 engaging with the lower roller follower 25 so that the valve member is held firmly against its seat. The follower frame is guided in its movements by its sliding engagement with the shaft 23 and by a guide pin 54 mounted centrally of the head 21 and slidably engaging with the lower portion of the follower frame.

Subsequent energization of the motor will cause the cam 22 to revolve back toward the position shown in Fig. 3, and in this operation the valve member is moved by the connection between the head 21 and the follower frame provided by the bolts 29. The opening operation is terminated by the controlling switch mechanism.

In the present embodiment of the invention the motor is of the reversing type so as to be capable of moving the valve member in one direction or the other from any position intermediate its stroke. In view of the large gear reduction employed between the motor and the cam shaft, a slow movement will be imparted to the valve member. This renders it possible to effect gradual changes in the size of the passageway through the valve. It will be understood in this connection that the switches 44 and 45 constitute limit switches operating to deenergize the motor at either end of the stroke of the valve member, and that ordinarily a thermostat or the like (not shown) is employed in conjunction with these switches to control the direction of rotation of the motor and hence the movement of the valve member.

At the end of the valve closing cycle, the springs 30 operate to hold the valve member firmly against its seat with a predetermined yielding pressure, the dwell surface 53 on the cam lobe being at this time in engagement with the lower roller follower 25. By reason of the employment of four springs arranged in two pairs on opposite sides of the cam with the springs of each pair on opposite sides of the cam shaft, a balanced force is applied to the valve member; and by distributing the load to four springs, shorter and smaller springs may be used so that a more compact arrangement is made possible.

The unitary character of the power unit mounted as it is in disengageable relation to the valve actuating mechanism permits of easy assembling and disassembling of the parts. Of the entire mechanism that portion most frequently requiring repair is the driving unit. When this occurs, a new unit may be quickly and easily substituted for the old and this without in any way disturbing the controlling switch mechanism because the latter is independently supported on the main frame. Further, the construction facilitates the enclosure of the motor and its gear train in an oil tight casing. In this latter connection, it is to be observed that it is possible in the case of a rotary shaft projecting from the casing to provide an effectual oil seal preventing the escape of oil.

It has been found that a shading ring induction motor is especially advantageous in the present combination in that such a motor can be immersed practically in an oil bath and this, even when temperature conditions are such as to render the oil so stiff as to interfere seriously with the operation of the high speed reducing gears. This is for the reason that such a motor has an inherent tendency to generate heat so that in cold weather, though the motor may be stalled initially because of the condition of the oil, the difficulty will disappear shortly after the application of current to the motor with a resulting generation of heat sufficient to eliminate any undue viscosity of the oil.

I claim as my invention:

1. A power driven valve operator comprising, in combination with a valve casing having an axially movable valve member, a frame mounted directly on said valve member and comprising a pair of parallel plates disposed on opposite sides of said member, valve actuating mechanism mounted in said frame and including a shaft bearing at opposite ends in said plates, a gear on said shaft, and a power unit having a drive shaft mounted parallel to said actuating shaft and having a pinion thereon meshing with said gear, said power unit being removably mounted directly on the outer face of one of said frame plates.

2. A valve actuating mechanism comprising, in combination, a reciprocatory member adapted to be associated with the valve to be operated, a cam mounted to turn on an axis extending transversely of and spaced from one end of said member, a follower for said cam arranged in end-to-end relation with respect to said member and having a lost motion connection with said member, and two pairs of elongated coiled springs spaced around the longitudinal axis of said member with one pair on each side of said follower, said springs tending to move said follower and member apart.

3. A power driven valve actuating mechanism comprising, in combination, an elongated casing having a flat side plate, a shaft having a bearing in said plate, a valve actuating device operatively associated with said shaft and enclosed in said casing, a spur gear on said shaft adjacent said plate, a second casing comprising a rigid frame member removably mounted directly on the outer face of said side plate and having a drive shaft journaled therein, said drive shaft having a spur pinion thereon meshing with said gear, and means including an electric motor enclosed in the second casing and having a speed reducing gearing connection with the drive shaft.

4. The combination with a valve casing having an axially movable valve member, a frame mounted on said casing, a valve operating stem projecting into said frame, a main shaft journaled in said frame transversely of the axis of said stem and spaced from the outer end of the stem, a cam on said main shaft, a follower for said cam having a yieldable lost motion connection with said stem, a power unit removably mounted at one side of said frame and comprising an electric motor, a drive shaft, speed reducing gearing between said motor and said drive shaft, and a speed reducing gear train between said drive shaft and said main shaft adapted to permit of the detachment of the power unit from said frame.

5. A power driven valve operator comprising, in combination, an elongated casing having a flat side plate, a valve operating mechanism enclosed in said casing, a second casing removably mounted directly on the outer face of said side plate, an electric motor in said second casing having a gearing connection with said valve actuating mechanism, said mechanism including a shaft projecting outwardly from said first casing at one side of said second casing, a switch mechanism operatively associated with the extended end of said shaft, and means coacting with said side plate and with said second casing to form an enclosure for said switch mechanism.

6. A power driven valve operator comprising, in combination, an elongated casing having a pair of spaced parallel plates, a valve actuating mechanism enclosed in said casing including a shaft extending transversely thereof and having bearings in said plates, a rotary actuating element on said shaft, a reciprocatory member movable by said element in a direction perpendicular to said shaft and having a plurality of abutments thereon, a valve stem having a head spaced from said abutments, a pair of springs on each side of said member with the springs of each pair disposed on opposite sides of said shaft, said springs being interposed between said abutments and said head, and means mounted at one side of said casing for driving said shaft.

7. A power driven operator for a valve, having a body and an axially movable valve member, an actuating mechanism for the valve member including a main supporting frame mounted on the valve body, a reciprocatory actuator alined with said valve member and having a yieldable lost motion connection with the valve member, a shaft mounted in said frame transversely of said actuator, a rotary element on said shaft operatively associated with said actuator to move it positively in opposite directions, said connection including longitudinally spaced abutments on the actuator and the valve member respectively and a plurality of elongated springs interposed between said abutments on opposite sides of said rotary element, and means for driving said shaft.

8. The combination with a valve having a body and an axially movable valve member, a main frame mounted on the valve body, a valve operating stem projecting into said frame, a main operating shaft journalled in said frame transversely of the axis of said stem and spaced from the outer end of the stem, an operative connection between said shaft and said stem including a reciprocatory actuator connected with the stem and a rotary element on said shaft operatively associated with the actuator, a power unit removably mounted at one side of said frame and comprising an auxiliary frame, a drive shaft mounted in said auxiliary frame and having one end projecting therefrom, an electric motor mounted in said auxiliary frame, speed reducing gearing carried by said auxiliary frame between said motor and said drive shaft, a gearing connection between the projecting end of the drive shaft and the main operating shaft and adapted to permit of the detachment of the power unit from said main frame, and a controlling switch mechanism for said motor carried by said frame independently of the power unit and actuated by said main operating shaft.

9. The combination of a valve, a member to be operated, a frame mounted on the valve, a main operating shaft journalled in said frame and operatively connected with said valve member, a power unit removably mounted at one side of said frame and comprising an oil-tight casing containing a quantity of oil, a drive shaft mounted in said casing and having one end projecting therefrom, a shading ring induction motor mounted in said casing, speed reducing gearing in the casing between said motor and said drive shaft, and a disengageable driving connection between said projecting end of the drive shaft and said operating shaft adapted to permit of the detachment of the power unit from said frame, said motor and speed reducing gearing being immersed in the oil in the casing.

10. The combination of a valve member to be operated, and a power unit comprising a casing containing a quantity of oil, a shaft mounted in said casing and having a part extending through the casing and operatively connected with said valve member, a shading ring induction motor mounted in the casing, and speed reducing gearing providing a driving connection between said motor and said shaft, said motor and gearing being immersed in the oil in the casing.

11. The combination of a valve member to be operated and a power unit, comprising a casing containing a quantity of oil, a supporting frame in said casing, a shaft mounted in said frame and having a part extending through the casing and operatively connected with said valve member, a shading ring induction motor mounted on said frame, a speed reducing gearing also mounted on said frame and providing a driving connection between the motor and said shaft, said motor and gearing being immersed in the oil in the casing.

PRESTON W. CUMMINGS.